(12) United States Patent
Wang et al.

(10) Patent No.: US 8,453,164 B2
(45) Date of Patent: May 28, 2013

(54) METHOD AND APPARATUS FOR REDUCTION OF EVENT NOTIFICATION WITHIN A WEB SERVICE APPLICATION OF A MULTI-FUNCTIONAL PERIPHERAL

(75) Inventors: Yao-Tian Wang, Sunnyvale, CA (US); Lifen Tian, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1274 days.

(21) Appl. No.: 11/863,153

(22) Filed: Sep. 27, 2007

(65) Prior Publication Data

US 2009/0089802 A1    Apr. 2, 2009

(51) Int. Cl.
G06F 9/44      (2006.01)
G06F 15/16     (2006.01)
G06F 3/12      (2006.01)

(52) U.S. Cl.
USPC .............................. 719/318; 358/1.1; 709/203

(58) Field of Classification Search
USPC .............................. 358/1.1; 709/203; 719/318
See application file for complete search history.

(56) References Cited

U.S. PATENT DOCUMENTS

| | | | |
|---|---|---|---|
| 5,452,452 A | 9/1995 | Gaetner et al. | |
| 5,867,735 A | 2/1999 | Zuravleff et al. | |
| 6,405,310 B1 | 6/2002 | Simpson | |
| 6,421,354 B1 | 7/2002 | Godlewski | |
| 6,449,657 B2 | 9/2002 | Stanbach, Jr. et al. | |
| 6,483,805 B1 | 11/2002 | Davies et al. | |
| 6,502,128 B1 | 12/2002 | Kumpf | |
| 6,631,407 B1 | 10/2003 | Mukaiyama et al. | |
| 6,633,874 B1 | 10/2003 | Nusbickel | |
| 6,718,378 B1 | 4/2004 | Machida | |
| 6,734,985 B1 * | 5/2004 | Ochiai .......................... 358/1.15 |
| 6,842,898 B1 | 1/2005 | Carlson et al. | |
| 6,873,427 B1 | 3/2005 | Matsuda et al. | |
| 7,058,734 B2 | 6/2006 | Chen et al. | |
| 7,065,556 B1 | 6/2006 | Hickey et al. | |
| 7,072,987 B2 | 7/2006 | Jurisch et al. | |
| 7,127,700 B2 | 10/2006 | Large | |
| 7,191,446 B2 | 3/2007 | Kosanovic | |
| 7,373,422 B1 | 5/2008 | Paul et al. | |
| 7,415,562 B2 | 8/2008 | Chen et al. | |
| 7,430,670 B1 | 9/2008 | Horning et al. | |

(Continued)

FOREIGN PATENT DOCUMENTS

EP      1 809 004 A2    7/2007
JP      2000-215099     8/2000

(Continued)

OTHER PUBLICATIONS

Herriot et al.: "Internet Printing Protocol (IPP): Event Notifications and Subscriptions" Mar. 2005 Xerox Corp. 3995 pp. 1-95.*

(Continued)

Primary Examiner — Charles E Anya
(74) Attorney, Agent, or Firm — Hickman Palermo Truong Becker Bingham Wong LLP

(57) ABSTRACT

Techniques are provided for reducing the amount of event notifications within a Web Service Application (WSA) of a device such as a multi-functional peripheral (MFP). In one technique, a Subscription ID is linked with a Job ID within a reduced notification table. When an event occurs related to a specific job, an event notification is sent only to the subscriber associated with that job.

16 Claims, 11 Drawing Sheets

U.S. PATENT DOCUMENTS

| | | | |
|---|---|---|---|
| 7,433,873 | B2 | 10/2008 | Kang |
| 7,467,384 | B2 | 12/2008 | Brubacher et al. |
| 7,567,360 | B2 | 7/2009 | Takahashi et al. |
| 7,633,644 | B2* | 12/2009 | Lum et al. .................... 358/1.16 |
| 7,765,248 | B2 | 7/2010 | Kanasaki |
| 7,856,638 | B2* | 12/2010 | Kaneda ........................ 719/318 |
| 7,895,361 | B2 | 2/2011 | Nishio |
| 8,112,766 | B2 | 2/2012 | Regnier et al. |
| 2002/0129110 | A1 | 9/2002 | Liu et al. |
| 2003/0110242 | A1 | 6/2003 | Brown et al. |
| 2003/0182347 | A1 | 9/2003 | Dehlinger |
| 2003/0187995 | A1 | 10/2003 | Fok et al. |
| 2003/0193685 | A1 | 10/2003 | Kageyama |
| 2003/0225894 | A1 | 12/2003 | Ito |
| 2004/0055002 | A1 | 3/2004 | Das |
| 2004/0111506 | A1 | 6/2004 | Kundu et al. |
| 2004/0111709 | A1 | 6/2004 | Furst et al. |
| 2004/0128558 | A1 | 7/2004 | Barrett |
| 2004/0143651 | A1 | 7/2004 | Allen et al. |
| 2004/0143671 | A1 | 7/2004 | Idnani |
| 2004/0226029 | A1 | 11/2004 | Gelme |
| 2004/0236829 | A1 | 11/2004 | Xu et al. |
| 2004/0249911 | A1 | 12/2004 | Alkhatib et al. |
| 2004/0267876 | A1 | 12/2004 | Kakivaya et al. |
| 2005/0021728 | A1 | 1/2005 | Sugimoto |
| 2005/0038708 | A1 | 2/2005 | Wu |
| 2005/0060431 | A1 | 3/2005 | Lewontin |
| 2005/0063003 | A1* | 3/2005 | Mishima et al. ............. 358/1.15 |
| 2005/0071507 | A1 | 3/2005 | Ferlitsch |
| 2005/0086330 | A1 | 4/2005 | Perham et al. |
| 2005/0138065 | A1 | 6/2005 | Ciriza |
| 2005/0144218 | A1 | 6/2005 | Heintz |
| 2005/0182843 | A1 | 8/2005 | Reistad et al. |
| 2005/0246428 | A1 | 11/2005 | Araumi |
| 2006/0031395 | A1 | 2/2006 | Kumagawa et al. |
| 2006/0077454 | A1* | 4/2006 | Lum et al. .................... 358/1.15 |
| 2006/0095541 | A1 | 5/2006 | Sojian et al. |
| 2006/0112012 | A1 | 5/2006 | Osborne |
| 2006/0117084 | A1 | 6/2006 | Morozumi et al. |
| 2006/0158676 | A1 | 7/2006 | Hamada |
| 2006/0174026 | A1 | 8/2006 | Robinson et al. |
| 2006/0190580 | A1 | 8/2006 | Shu et al. |
| 2006/0256392 | A1* | 11/2006 | Van Hoof et al. ............. 358/402 |
| 2007/0073865 | A1 | 3/2007 | Motoyama et al. |
| 2007/0083618 | A1 | 4/2007 | Kim |
| 2007/0083679 | A1 | 4/2007 | Kikuchi |
| 2007/0086430 | A1 | 4/2007 | Kemp |
| 2007/0118642 | A1* | 5/2007 | Kumbalimutt ................ 709/224 |
| 2007/0220142 | A1 | 9/2007 | Moorer et al. |
| 2008/0147886 | A1 | 6/2008 | Ferlitsch |
| 2009/0271501 | A1 | 10/2009 | Shenfield et al. |

FOREIGN PATENT DOCUMENTS

| | | | |
|---|---|---|---|
| JP | 2004-507818 | | 3/2004 |
| JP | 2004-114674 | | 4/2004 |
| JP | 2005339520 | A | 12/2005 |
| JP | 2006-087058 | | 3/2006 |
| JP | 2006-293779 | | 10/2006 |
| JP | 2006295883 | | 10/2006 |
| KR | 2004000697 | A | 1/2004 |

OTHER PUBLICATIONS

European Patent Office, "European Search Report", application No. EP 08165235, dated Mar. 25, 2009, 8 pages.

Quiroz, Andres, et al., "Design and Implementation of a Distributed Content-based Notification Broker for WS-Notification", XP-002519356, IEEE, 2006, 8 pages.

Vinoski, Steve, "Web Services Notifications", Toward Integration, XP-002519355, IEEE Computer Society, 2004, 6 pages.

Box, Don, et al., "Web Services Eventing (WS-Eventing)", XP-002519357, Aug. 2004, 38 pages.

Jammes, Francois et al., "Service oriented device communications using the devices profile for Web services", ACM 2005, 8 pages.

Stal, Michael, "Web Services: beyond component-based computing", ACM Oct. 2002, vol. 45, No. 10, pp. 71-76.

Jammes, F. et al., "Service-Oriented Device Communications Using the *Devices Profile for Web Services*" MPAC (Dec. 2, 2005) 8 pages.

Seely Scott, "Understanding WS-Security" Web Services Specifications, Microsoft Corporation, Dated Oct. 2002, 12 pages.

Alexander et al., "Web Services Transfer (WS-Transfer)", W3C Member Submission, Dated Sep. 27, 2006, 24 pages.

Web Services Security, "SOAP Message Security 1.1 (WS-Security 2004)", OASIS Standard Specification, Dated Feb. 1, 2006, 76 pages.

European Communication received in Application No. 07252034.9 dated Nov. 5, 2010 (11 pages).

D1: Ekanayake, J. et al., "Common Architecture for Functional Extensions on Top of Apache Axis 2" XP002455230, Apr. 24, 2006 (6 pages).

D2: Anonymous, "Axis2 Architecture guide" Internet Article, XP002455231, Apr. 7, 2006 (12 pages).

D3: Buschmann, F. et al., "Pattern-Oriented Software Architecture," XP002455240, 1996 (10 pages).

D4: Ivens, K. et al., "Windows 2000: The Complete Reference" 2000, 15 pages.

Hansen, Jennnie, "Distributed Largest-First Algorithm for Graph Coloring", Springer-Verlag, Berlin Heidelberg, 2004 8 pages.

U.S. Appl. No. 11/641,453, filed Dec. 18, 2006, Notice of Allowance, mailed Feb. 9, 2011.

U.S. Appl. No. 11/644,181, filed Dec. 21, 2006, Office Action, mailed Feb. 4, 2011.

U.S. Appl. No. 11/818,013, filed Jun. 12, 2007, Notice of Allowance, mailed Apr. 17, 2012.

U.S. Appl. No. 11/652,179, filed Jan. 10, 2007, Final Office Action, mailed May 1, 2012.

* cited by examiner

METHOD AND APPARATUS FOR REDUCTION OF EVENT NOTIFICATION WITHIN A WEB SERVICE APPLICATION OF A MULTI-FUNCTIONAL PERIPHERAL

CROSS-REFERENCE TO RELATED APPLICATIONS

The subject matter of this patent application is related to U.S. application Ser. Nos. 11/641,510; 11/641,355; and 11/641,366; all of which were filed on Dec. 18, 2006.

FIELD OF THE INVENTION

The present invention relates to devices such as but not limited to multi-function peripherals (MFPs), and more particularly to processing event notifications therein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The term "Web services" describes a standardized way of integrating Web-based applications using the XML, SOAP, and WSDL standards over a networking protocol. XML is used to tag the data, SOAP specifies how to encode a Web service request and response into an XML message, and WSDL is used for describing the services available. Web services are used for programmatic and networked entities to communicate with each other, regardless of the platform for their implementation. Because many such entities are business-related, Web services allow businesses to communicate data without intimate knowledge of each other's IT systems behind a firewall.

Web services share business logic, data, and processes through a programmatic interface across a network. Web services allow different applications from different sources to communicate with each other without time-consuming custom coding. And, where those communications are in XML, Web services are not tied to any one operating system or programming language. For example, Java can talk with Python and Windows applications can talk with UNIX applications.

Web Services specifications compose together to provide interoperable protocols for security, reliable messaging, and transactions in loosely coupled systems. Web Services specifications include both approved standards (e.g. by the World Wide Web Consortium (W3C) and the Organization for the Advancement of Structured Information Standards (OASIS)) and proposed documents and drafts that may become standards.

One approach for providing multiple services that take advantage of Web Services specifications is through a multi-functional peripheral (MFP). Such services may include printing, copying, faxing, scanning, and archiving. Each service may be provided by a Web Service Application (WSA) running on the MFP.

However, a WSA may generate a large amount of event notifications whenever an MFP completes a job. One possible example of an MFP that may generate numerous event notifications is an high speed printer/scanner/copier. In an office or corporate environment, it is not unlikely to have hundreds or even thousands of PC clients sharing one large MFP. It is possible that each client may be a subscriber to all the job events the MFP is capable of generating. These job events include but are not limited to notifying a specific user that their print job is completed. In such a case, for every job event, the WSA would generate and send a unique event notification for every PC client subscribed.

Each MFP may put out numerous notifications in a short amount of time. These notifications vary in type, size, time to process, and require various components of an MFP. Such an environment would create and send hundreds or thousands of notifications. That could easily overwhelm the resources available to the printer/scanner/copier, or any other typical MFP, and also cause too much network traffic. Thus, it would be helpful to provide an MFP with a mechanism for reducing the amount of these notifications.

SUMMARY

Techniques for reducing the number of notifications from a WSA are provided. In one embodiment of the invention, notifications are reduced by generating a table that associates a subscription ID with a specific job ID. The invention then ensures that notifications relating to a specific job ID are sent only to the subscribed client that created the job.

In a further embodiment, a subscription ID is associated with a destination name.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are depicted in block diagram form in order to avoid unnecessarily obscuring the present invention.

Figure 1:
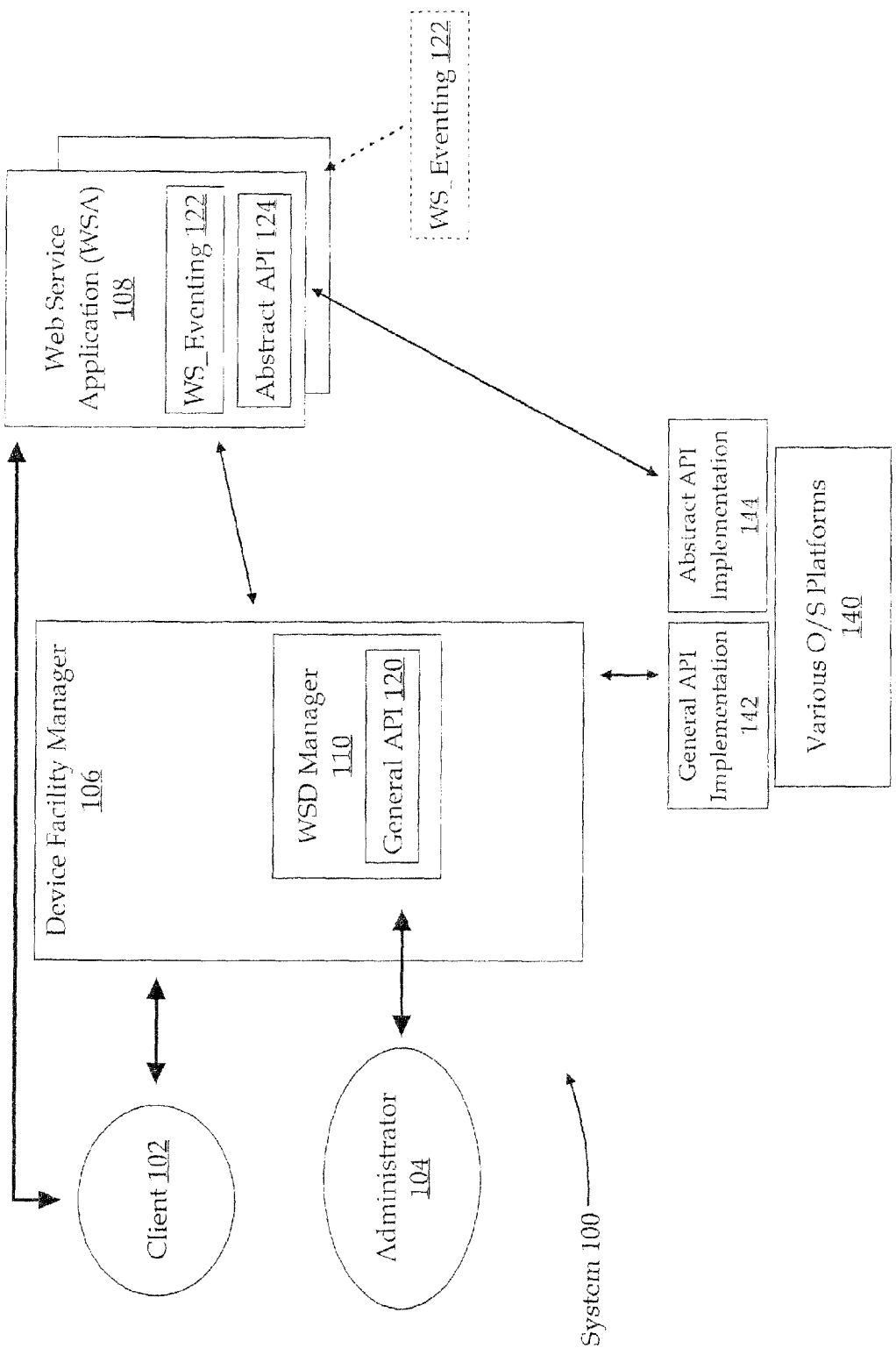
FIG. 1 is a block diagram that illustrates an example system for processing communications with an MFP, according to an embodiment of the invention.

FIG. 1 is a block diagram that illustrates an example system 100 for processing communications within a Multi-Function Peripheral (MFP), according to an embodiment of the invention. The system 100 includes a client 102, an administrator 104, a Device Facility Manager (DFM) 106, and a plurality of WSAs 108 executing on the MFP.

The system 100, as indicated within FIG. 1, may comprise multiple Operating System (O/S) platforms 140, including but not limited to a legacy O/S, Linux or VxWorks. The client 102 could be Windows Vista, as well as others. One or more of the WSAs 108 may execute within the platforms 140.

The DFM 106 represents the MFP by responding to discovery requests, metadata requests from client 102, and configuration and other MFP administration requests from an administrator 104. The DFM 106 may act as a repository of implementations of multiple Web Service specifications, such as but not limited to WS-Discovery, WS-MetadataExchange, WS-Transfer, and WS-Security.

Each WSA 108 executing on the MFP provides a service to client 102 that requests the service. Each WSA 108 may employ a service specific abstract API, such as the abstract API 124, independent from the target platform. As depicted in FIG. 1, each WSA 108 may also employ a WS-Eventing module 122, either internally or externally to the WSA 108.

The client 102 may discover that an MFP exists via a discovery request or a discovery HELLO message (i.e., a broadcast or multicast message announcing the MFP to devices on the same network). Once the client 102 is aware of the existence of an MFP, the client 102 sends a device metadata exchange request, e.g. via WS-MetadataExchange, to discover all the services that the MFP provides. The DFM 106 receives the request and returns metadata describing the various services provided by the MFP. The client 102 may request service metadata from a particular service application executing on the MFP, such as the WSA 108. This WSA 108 may request the service metadata from a Web Service Device (WSD) Manager 110, which returns the service metadata to WSA 108. WSA 108 forwards the service metadata to client 102.

Alternatively, the device metadata of the MFP and the service metadata of one or more WSAs may be sent to client 102 in the same response.

Based on the service metadata, the client 102 generates and transmits a request corresponding to a service provided by WSA 108 which WSA 108 receives and processes. Based on a service request, WSA 108 may use an abstract API 124 to make a platform-specific call to an implementation of abstract API 124, such as an abstract API implementation 144. In this way, a developer of a Web service application may focus on the development of the Web service itself and without having to know the complexities of the underlying platform upon which the Web service executes. Therefore, someone other than the Web service application developer with knowledge of the target platform may define the implementation of the corresponding abstract API.

The client 102 is an application that is associated with a process that requests one or more services provided by an MFP. The client 102 is typically an application associated with the operating system that supports the initial requesting process. One potential purpose of the client 102 is to convert a platform-specific procedure call from a requesting process to a SOAP request that can be processed by an application that "understands" SOAP.

For example, the requesting process may be associated with a Microsoft Word application and WSA 108 may provide a print service. Client 102 may then be an application associated with the operating system that supports the initial requesting process. The client 102 receives a platform-specific "print data" request sent from the requesting process. The client 102 then encodes the print data request in a SOAP message that can be processed by WSA 108 that "understands" SOAP messages.

DFM 106 represents an MFP by accepting discovery requests, requests for logging information, and configuration instructions. According to an embodiment, the DFM 106 also acts as a repository of implementations of multiple Web Service specifications. Thus, DFM 106 includes a shared library of routines that each implements one or more functions defined by one or more Web Services specifications (e.g. WS-Security, WS-MetadataExchange). In this way, multiple Web Service specifications may be implemented once and then shared with each of the multiple Web service applications executing on the MFP.

The Web Services Application (WSA) module 108 provides one or more Web services and relies on Web Services protocols and technologies, such as those protocols provided by DFM 106. The WSA 108 may also comprise a WS-Eventing module 122 for responding to event requests from client 102, as depicted by the solid box in FIG. 1. Alternatively, the WS-Eventing module 122 may be located outside of the WSA 108, as depicted by the dotted box in FIG. 1. In either case, the client 102 may subscribe to an event associated with the service provided by WSA 108. For example, WSA 108 may be a printing application and an event that client 102 subscribes to is when the MFP associated with WSA 108 completes a print job. Thus, upon completion of the job, WSA 108 will send an event message to client 102 indicating that the print job is completed. Additional details about integrating WS-Eventing into a WSA are provided in a section below.

WSA 108 may also comprise an abstract API (e.g. abstract API 124) through which platform-specific calls may be generated. The abstract API defines an interface by which the associated WSA 108 invokes one or more functions on the MFP. Therefore, the developer of the WSA 108 is not required to know the underlying complexities of the target platform, but only of the new service that the developer aims to provide. If an abstract API has been defined by a Web service application developer, then an implementation of the abstract API for a specific platform must be defined. A different implementation may be defined for the same WSA/same abstract API running on some other platform, e.g. linux. Either the developer of the Web service application may define the implementation or someone else who has knowledge of the target platform may define the implementation.

The following references to WS-Eventing are meant to apply to eventing specifications as a whole, and thus also apply to other eventing specifications, such as but not limited to WS-Notification. Accordingly, an MFP may implement WS-Notification instead of WS-Eventing, or may implement some other eventing specification not explicitly named herein. References to WS-Eventing should not be considered as limiting this specification exclusively thereto.

One approach for providing multiple Web Services specifications to the WSAs of an MFP is to implement the Web Services specifications in a single location of the MFP, such as in the DFM 106. In that way, the Web Services are implemented once and shared among all WSAs 108 of the MFP. However, implementing a WS-Eventing module within the DFM 106 is problematic for various reasons.

WS-Eventing was initially designed to be a simple event subscription and notification service. However, some WSAs require more than such a simple event service. Therefore, WS-Eventing must be extended to allow those WSAs (such as those that provide a scanning service) to perform additional processing of an event subscription request before an event subscription response message is sent to the requesting client. Such additional processing is required because some event subscription requests contain information that is specific to the corresponding WSA.

If WS-Eventing is implemented within a DFM 106 of an MFP, then additional communications have to be made between the WSA 108 and DFM 106 because the DFM is unaware of the specifics of the WSA 108. Therefore, the communication complexity between the WSA 108 and DFM 106 increases, which tends to result in errors and at least a degradation in processing time. If a client receives no subscription response message or receives an error message in response to an event subscription request, then the perceived utility of the MFP is significantly reduced.

Therefore, according to an embodiment of the invention, the WS-Eventing module 122 is integrated into one or more WSAs 108 of an MFP, as depicted in FIG. 1. Not only does this built-in functionality (referred to hereinafter as the "event manager") provide a general eventing implementation (such as subscription creation, management and event delivery), the event manager may also work closely with other components of the corresponding WSA 108, which enables efficient bi-directional communication between those components and the event manager. Alternatively, the WS-Eventing module 122 can be implemented outside of but in close communication with the WSA 108, as depicted by the dotted lines in FIG. 1.

Figure 2:
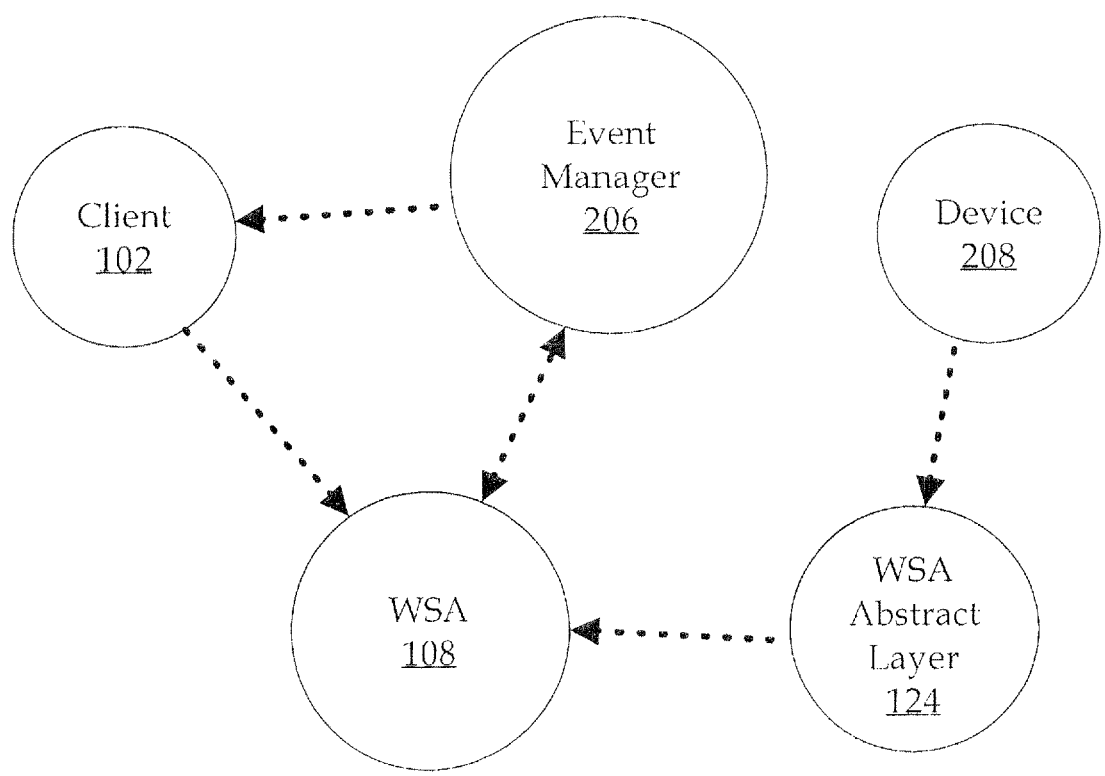
FIG. 2 is a balloon diagram that illustrates how an event subscription request is processed by a WSA and its associated event manager, according to an embodiment of the invention.

FIG. 2 is a block diagram that illustrates the relationships of various eventing components of the system 100, some of which were depicted in FIG. 1. A client 102 sends an event subscription request to the WSA 108, which communicates with the event manager shown in FIG. 2 as event manager (EM) 206. The EM 206 implements the WS-Eventing feature 122 depicted in FIG. 1 in order to process event subscription requests and send event subscription response to the client 102.

The EM 206 may be implemented as a thread or module within the WSA 108. At a later point in time, a device 208 sends a notification of an event to the abstract layer 124 of the WSA 108, which then forwards the notification to the WSA 108. The abstract layer 124 may be implemented as a separate module, for example, or a thread dedicated to communicating with the various platforms of the MFP. Alternatively, the device 208 can bypass the abstract layer 124 and send the notification directly to the WSA 108. The device 208 may be, for example, the target platform from which at least some events are generated.

The WSA 108 then forwards the notification to the EM 206, which is a relatively simple procedure because the EM 206 may be implemented as a module or thread within the WSA 108. At that point, the EM 206 processes the notification, composes an event notification message, and sends the message to the client 102.

Figure 3:
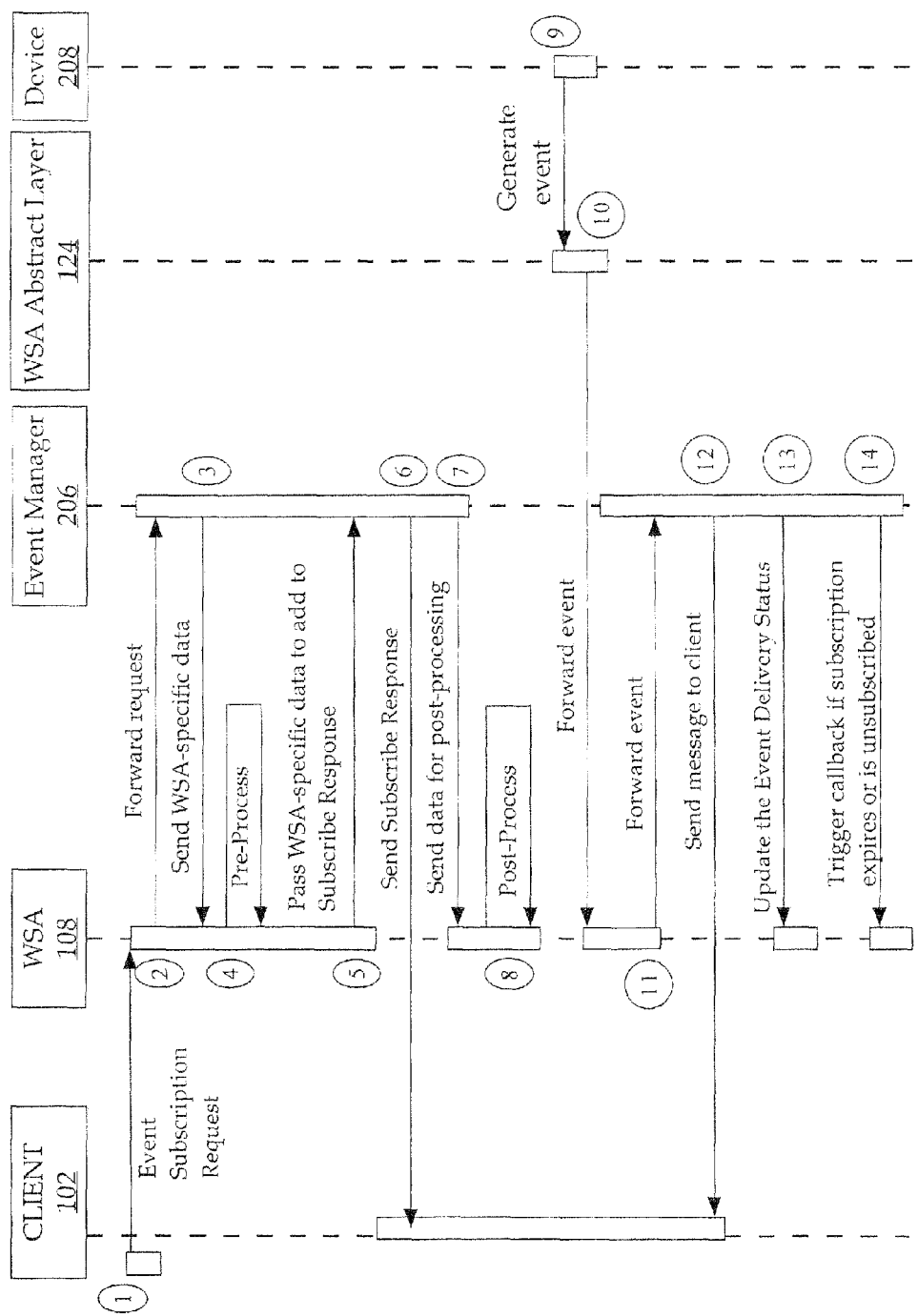
FIG. 3 is a sequence diagram illustrating various threads that may execute within a Web Service Application (WSA) of an MFP, according to an embodiment of the invention.

FIG. 3 is a sequence diagram that illustrates in further detail how an event subscription request may be processed by a WSA 108 and its associated EM 206, along with other components depicted in FIGS. 1 and 2, according to an embodiment. In FIG. 3, all events occur in chronological order, where time advances from top to bottom.

At step 1, a client 102 generates an event subscription request and sends the request to a WSA 108. At step 2, the WSA 108 forwards the subscription request to the EM 206. Because the WSA 108 does not know the WS-Eventing specification, it is unable to retrieve any necessary WSA-specific data contained within the subscription request. If the WSA 108 provides a scanning service, then such WSA-specific data may be the destinations of a scan job. Therefore, the EM 206 retrieves the WSA-specific data from the subscription request and sends it (step 3) to the WSA 108 for processing.

Before step 3, the EM 206 may determine whether the event subscription request is formatted properly (i.e., according to the WS-Eventing specification). If not, then the WSA 108 or EM 206 may send a fault message directly to the client 102.

At step 4, the WSA 108 pre-processes the WSA-specific data before the EM 206 composes an event subscription response. For example, if the WSA 108 provides a scanning service, then the event subscription request from client 102 identifies destinations in which to send scanned document(s). Thus, the WSA 108 may include a destination manager that manages destinations specified in the WSA-specific data. During this pre-processing, if the WSA 108 determines (e.g., using its destination manager) that the destinations are invalid, then it may send a fault message (at step 5) directly to the client 102 to notify client 102 of the error, after which processing of the event subscription request halts. Thus, no extra communication between the WSA 108 and the EM 206 is required, which is one of the benefits of implementing a WS-Eventing module 122 within a WSA.

One example of destinations being invalid is that a threshold number of destinations was exceeded in the event subscription request.

Alternatively, at step 4, the WSA 108 may not recognize the WSA-specific data. As a result, the WSA 108 may send a fault message (at step 5) directly to the client 102 to notify that client of the error.

Another example of pre-processing at step 4 is also in the scanning context. The WSA 108 may map the destinations specified in the WSA-specific data to alternate destination addresses for security purposes. The alternate destination addresses are sent to the EM 206, which adds the alternate destination addresses to an event subscription response that is sent to client 102.

Data that is passed from the WSA 108 to the EM 206 (e.g., alternate destination addresses) are passed as a "black box"—EM 206 has no knowledge of the content of the data and does not perform any processing on the data. The EM 206 simply inserts the data as-is into a fixed location inside the event subscription response. In other words, the WSA 108 and EM 206 really do not have knowledge of each other's data, which is important in integrating an event manager in a WSA such that they remain modular and independent of each other.

Similarly, when the EM 206 extracts WSA-specific data out of a request, EM 206 simply retrieves the data at a fixed point in the request, without knowing the content of the data.

At step 5, if no fault messages are sent, the WSA 108 sends WSA-specific data to EM 206 to include in an event subscription response message ("subscribe response"). At step 6, EM 206 sends the subscribe response to client 102 that notifies client 102 that the event subscription request was successful. Because the WSA 108 does not "know" the WS-Eventing specification, the EM 206 is responsible for generating the subscribe response.

At step 7, the EM 206 sends data to the WSA 108 for post-processing, after which the WSA 108 may post-process the data (step 8). For example, in the scanning example, the WSA 108 may add and save the destinations specified in the subscription request to a destination list (e.g., using a destination manager) in local memory for future use.

One reason for the post-processing of step 8 is that the WSA 108 may need to make use of the data created by the EM 206 when the EM 206 composes the subscribe response. For example, the WSA 108 may need to keep track of a subscription identifier that the EM 206 generates to uniquely identify the accepted subscription. Therefore, post-processing should not be combined with pre-processing. However, this is an atypical case. The WSA 108 generally does not know anything about eventing, but instead delegates that responsibility to other modules, including but not limited potentially to the WS-Eventing module 122 (for example).

Another reason for the post-processing of step 8 is to avoid an unnecessary processing step. During pre-processing (step 4), EM 206 needs to extract WSA-specific data, if applicable. It is optional for EM 206 to validate the event subscription request based on the WS-Eventing specification. If EM 206 determines that the event subscription request is invalid before the composition of a subscription response message, then EM 206 notifies WSA 108 about the error, so that the WSA 108 does not need to execute the post-processing step.

The separation of pre- and post-processing from the event manager subscription processing is to maximize flexibility and extensibility while maintaining the modularity of the event manger and the WSA. In this way, neither the event manager nor the WSA are required to understand each other's data schema or business logic.

At step 9, the device 208 generates an event and sends an indication of the event to the abstract layer 124. At step 10, the abstract layer 124 forwards the event indication to the WSA 108, which in turn generates a WSA-specific notification body and passes it to the event manager 206 (step 11). In one embodiment, the WSA 108 includes an event processing thread that receives such event indications from the abstract layer 124 and delivers event notifications to the event sink. In this way, the task of processing event subscription requests may be separated from the tasks of processing generated events and delivering event notifications. Thus, the following steps may alternatively be performed by one or more event processing threads.

At step 12, the EM 206 composes a proper event notification message based on the notification body and sends the message to the event sink, which may include client 102 and any other clients for which client 102 may have subscribed an event. At step 13, the EM 206 updates the delivery status of that particular event (e.g., that the appropriate client was notified of the event).

At step 14, EM 206 notifies the WSA 108 if the event subscription expires or is unsubscribed. Some WSAs need to take certain actions when certain event subscriptions are removed due to expiration or being unsubscribed. For example, if a client registers scan destinations via an event subscription request and that subscription is deleted, then the scanner WSA needs to remove the registered scan destinations.

Integrating a WS-Eventing module into a WSA 108 may provide many advantages over other possible approaches, such as implementing WS-Eventing within a device facility manager (DFM). One benefit is that large amounts of data do not have to be passed across an application boundary. Another benefit is that the possibilities of communication errors between applications are eliminated, at least in the WS-Eventing context. Also, where WS-Eventing is integrated within a WSA 108, it is relatively straightforward for the EM 206 to extract WSA-specific data from an event subscription request and response and to pass WSA-specific data to an event manager. Furthermore, a WSA 108 has control over other features of the event manager. For example, a WSA 108 can call the event manager's function to clean up expired subscriptions when the WSA is idle, instead of having the event manager create a designated thread for subscription cleanup.

Integrating WS-Eventing into a WSA also maintains the modularity of the WSA and its associated event manager. Such modularity facilitates the straightforward design and future updating of the WSA and the event manager. Lastly, a WSA is enabled to receive timely updates from the event manager about the delivery status of event notifications.

Figure 4:
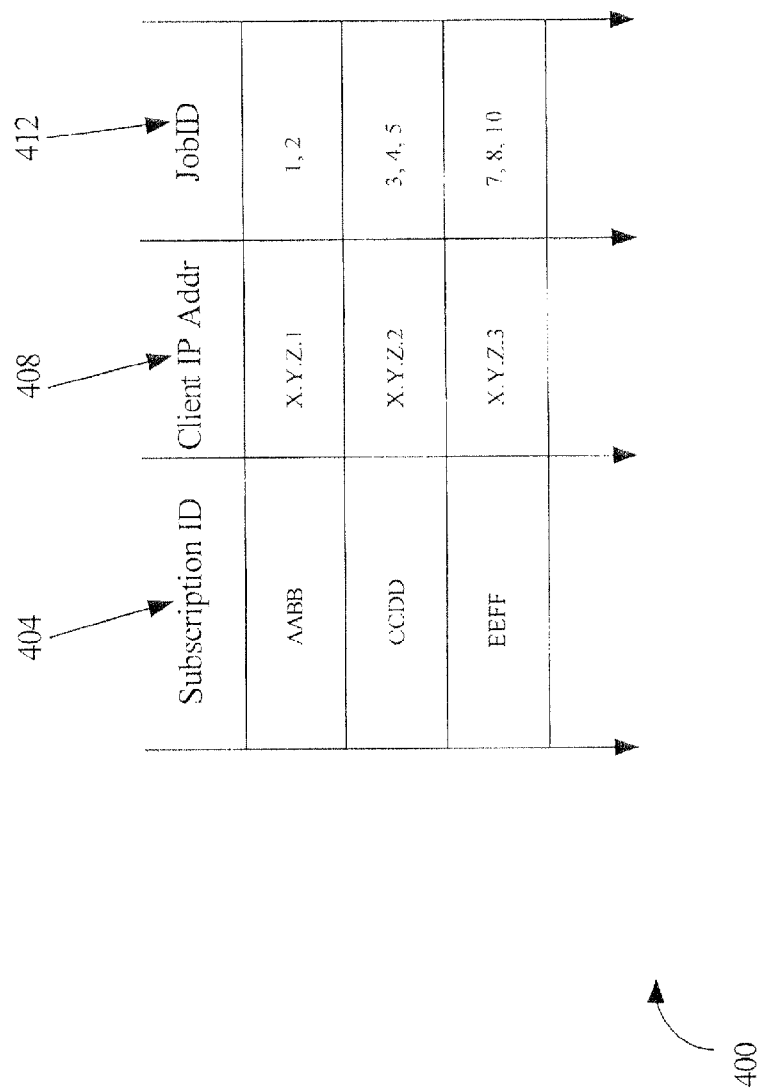
FIG. 4 is an example of a data table that can be built for associating subscription IDs with Job IDs, according to an embodiment of the invention.

According to an embodiment, an approach is provided for reducing event notifications from a device, such as but not limited to an MFP. To facilitate this, FIG. 4 shows a table 400 that is built with at least three fields: Subscription ID 404; Client IP Address 408; and JobID 412. The table 400 could have other sizes, and have other formatting. Thus, the arrangement depicted in FIG. 4 is but for example purposes only, and should not be considered as limiting in any context.

The Subscription ID field 404 is the ID of the subscription which the EM 206 generates to uniquely identify the accepted subscription. The Client IP Address field 408 holds the IP address of the specific client, which identifies the client to whom a specific Subscription ID was assigned. The Job ID field 412 is the ID of a specific job that is currently being performed or is being completed by the MFP.

Although only three entries are depicted in the table 400 of FIG. 4, that is but for example purposes only. It is expected that the table 400 could become significantly larger than that depicted in FIG. 4, as connoted by the arrows on its bottom.

Figure 5:
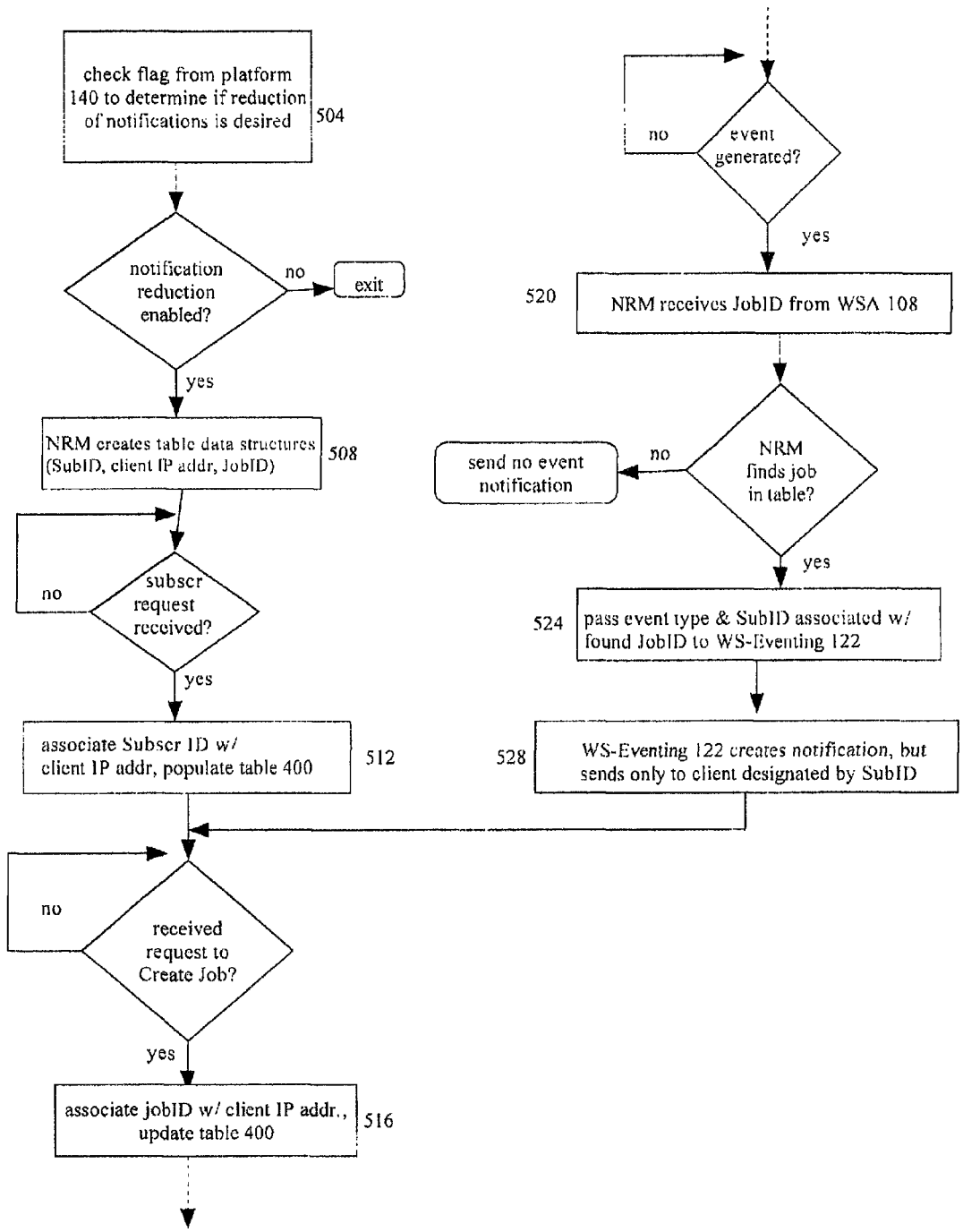
FIG. 5 is a flow diagram according to an embodiment of the invention.

FIG. 5 is a flowchart showing how the table 400 is built, populated, and utilized. First, at step 504, the invention checks the O/S platform 140 to see if a flag for notification reduction is enabled. There are instances in which notification reduction may be disabled, or the particular platform does not support notification reduction at all. Thus, this flag is not always enabled.

If the notification reduction flag is enabled, as depicted in step 508, the notification reduction module (NRM) creates the data structure for the table 400. At this point, the table 400 is not yet populated with any data, but the data structure itself is reserved in memory. Next, the MFP waits for subscription requests from the various clients 102 that wish to use its services. As those subscription requests occur, the notification reduction module associates the client's Subscription ID with its specific IP address, and populates two thirds of a particular entry within the table 400, as shown in step 512.

The notification reduction module then waits for job requests from the various clients 102. When a request for services by an MFP occurs, a Job ID for that service is created, as shown in step 516. At the same time, the notification reduction module then associates that Job ID with a client IP address, and updates the table 400.

The notification reduction module then waits for events related to a job or jobs to occur. When an event related to a specific job occurs, as shown in step 520, the notification reduction module receives the JobID from the WSA 108. The notification reduction module then searches the table 400 for the Job ID that caused the event. If it cannot find the Job ID, no notification is sent out because that means the client that created the job which generated the event did not make any job event subscriptions. If however the notification reduction module finds the Job ID, it passes the subscription ID associated with that Job ID to the WS-Eventing module 122, as depicted in step 524. The WS-Eventing module 122 then creates a notification and, based on the subscription ID extracted and passed by the NRM, ensures that the notification is sent only to the client that is associated with the particular subscription ID, as shown in step 528. This results in job-related event notifications being sent only to clients that created that job and subscribed to that type of event, thereby achieving reduced notifications.

It is worthwhile to note that a single client can have multiple subscription IDs, as that client may use many different functionalities of the MFP. In such a case, the table 400 may have several different subscription IDs all sharing the same IP address, because one client can send multiple subscription requests.

Figure 6:
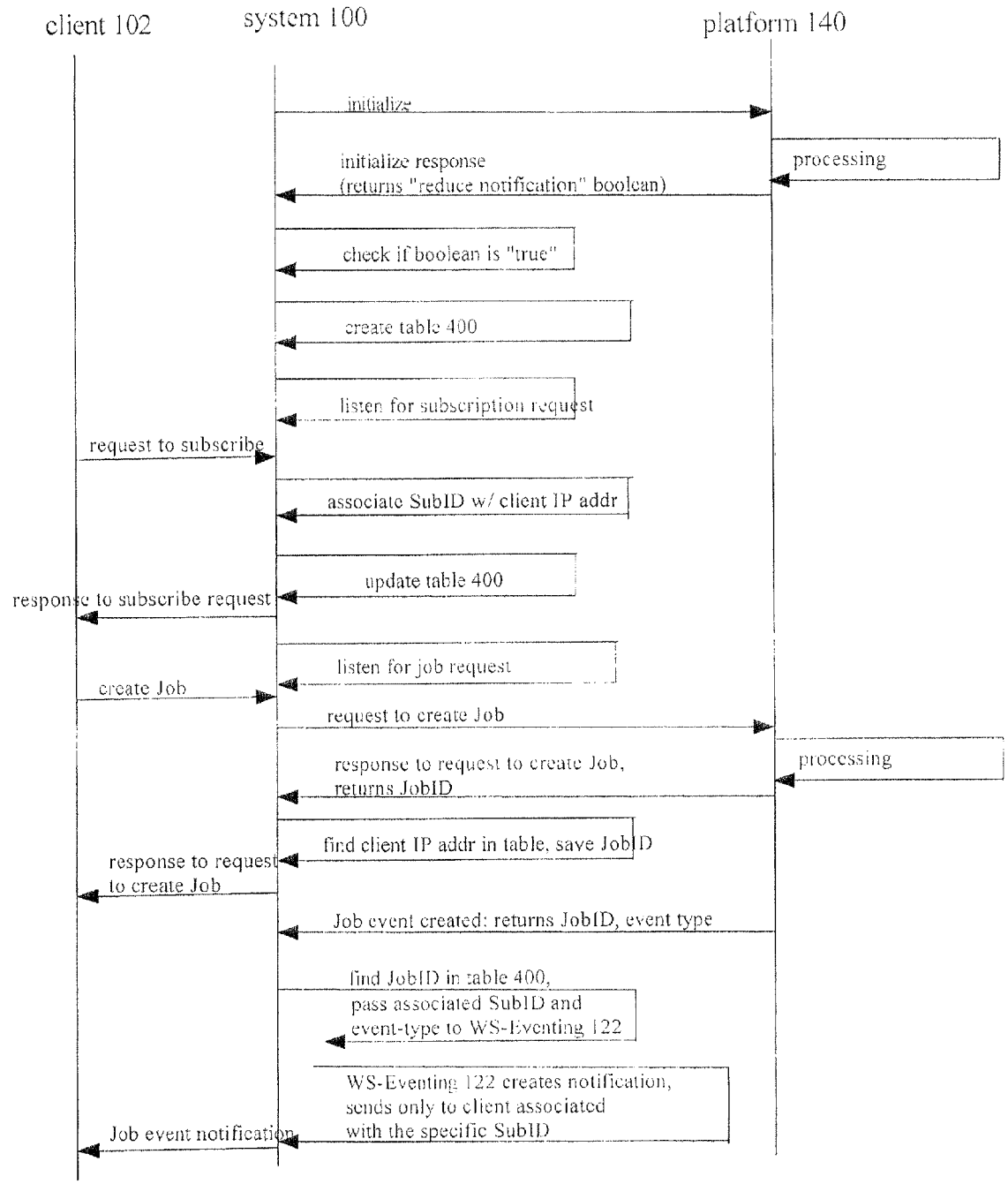
FIG. 6 is a sequence diagram according to the embodiment depicted in FIG. 5.

FIG. 6 is a sequence diagram intended in part to clarify the information within FIGS. 4 and 5, as well as other aspects of the invention. In FIG. 6 the responsibilities for the various steps are divided between the client 102, the system 100, and the platform 140. Within FIG. 6, the various steps and responsibilities are arranged in chronological order, with time advancing from top to bottom.

The sequence depicted in FIG. 6 has basically six main parts. First, determine if notification reduction is enabled. If so then second, form the table 400. Third, listen for subscribers and populate their Subscription IDs and IP addresses in the table 400. Fourth, listen for job requests, and associate those job IDs with a client IP address within the table 400.

At this point, the reduced notification table 400 is filled. The fifth step is to listen for event notifications related to a specific job ID. If an event notification occurs, the sixth and final step would be to use the table 400 to ensure that those notifications are sent only to the appropriate client based on their Subscription ID.

A further variation exists. As noted above, the IP address field within the table 400 is of the client who made the subscription request. However, other scenarios exist. For example, there may be instances in which a Client A subscribes to all events that occur on behalf of a Client B, and thus indicates that Client B is the event sink. This means that the NotifyTo field holds Client B's IP address, so that Client B will receive any event notifications.

Meanwhile, suppose that Client B sends a job creation request to the WSA 108. In such a case, if the table 400 has only 3 fields (event subscriber (ClientA) IP address, subscription ID, and job ID), there won't be any matched entries in the table 400. This is because Client A is associated with the subscription, but Client B is associated with the job. Thus, neither Client will be notified of an event.

To address this, a fourth field can be added to the table 400. When the table 400 holds subscriber (ClientA) IP address, NotifyTo (ClientB) IP address, subscription ID, and job ID, the job requester's IP address will be compared against the subscriber IP address or the NotifyTo IP address. Using the previous example, the job requester is Client B and it matches the NotifyTo address, so the entry will be saved in the table 400.

Figure 7:
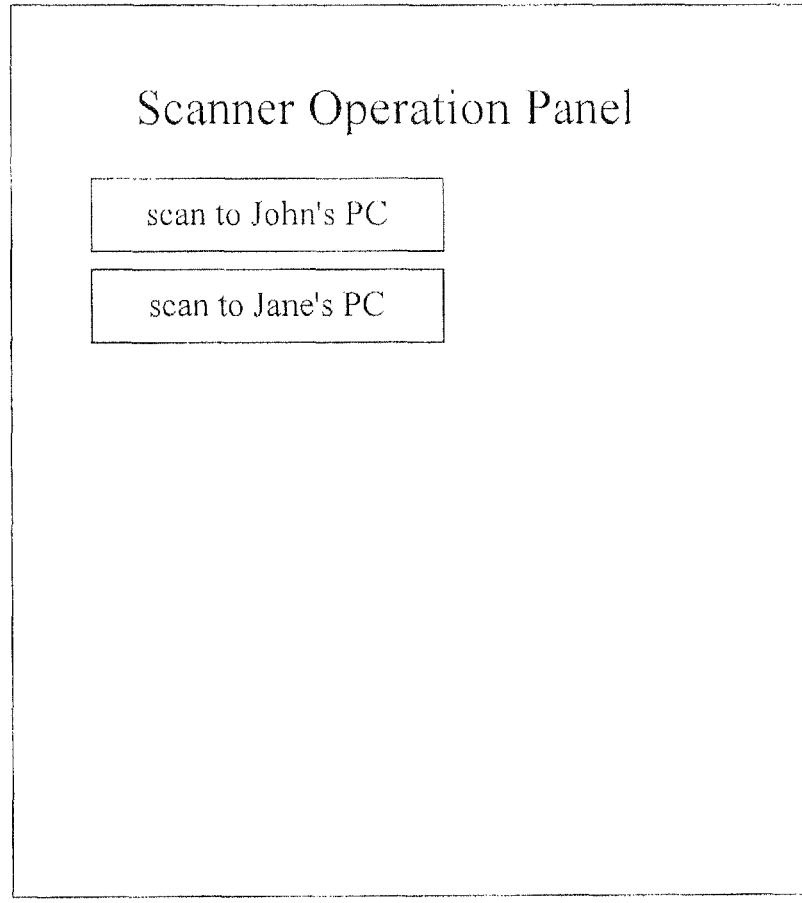
FIG. 7 is a partial view of operation panel display according to an embodiment of the invention.

Another type of reduced notification mechanism also exists, and is described in FIGS. 7-10. This second embodiment is described using a ScanAvailableEvent feature, but other features not related to ScanAvailableEvent could also be implemented therein. As depicted in FIG. 7, the typical scanner operation panel 700 allows a user to designate where to send a scanned image. From the panel 700 it is apparent that the scanner can be connected to multiple destinations, each of which has a scan destination display name, of which two (John's PC, Jane's PC) are depicted. The destination display name is intended to be a user-recognizeable form of a scan destination.

It is to be noted that a client 102 can subscribe to all ScanAvailableEvents, even those events of which it has no business receiving. This imposes various security holes, as an ill-behaved client 102 can get wind of various events that are none of her business. Thus, Jane or some or other malicious client could learn that John is about to receive a confidential document. Such an event could in some circumstances be considered a security breach. As stated earlier, it is also desired to reduce network traffic. The second embodiment addresses these and other issues as will be explained hereinafter.

To understand how the second embodiment works, it is important to understand the subscription process. A subscribe request is sent from client 102 to the WSA 108. Within the second embodiment, the subscribe request for e.g. ScanAvailableEvent contains scan destination registration related fields (e.g. scan destination display name), in addition to fields that are defined by the WS-Eventing specification. Subscribing enables a client to be made aware of events of interest to that client such as status of a specific job, status of the scanner/printer portion of the MFP, and also notification of a ScanAvailableEvent (scanner portion only).

An example Destination Display Name field is shown in the panel 700 in FIG. 7. The Notify To field or event sink is used to receive the various notifications sent out by the MFP.

Figure 8:
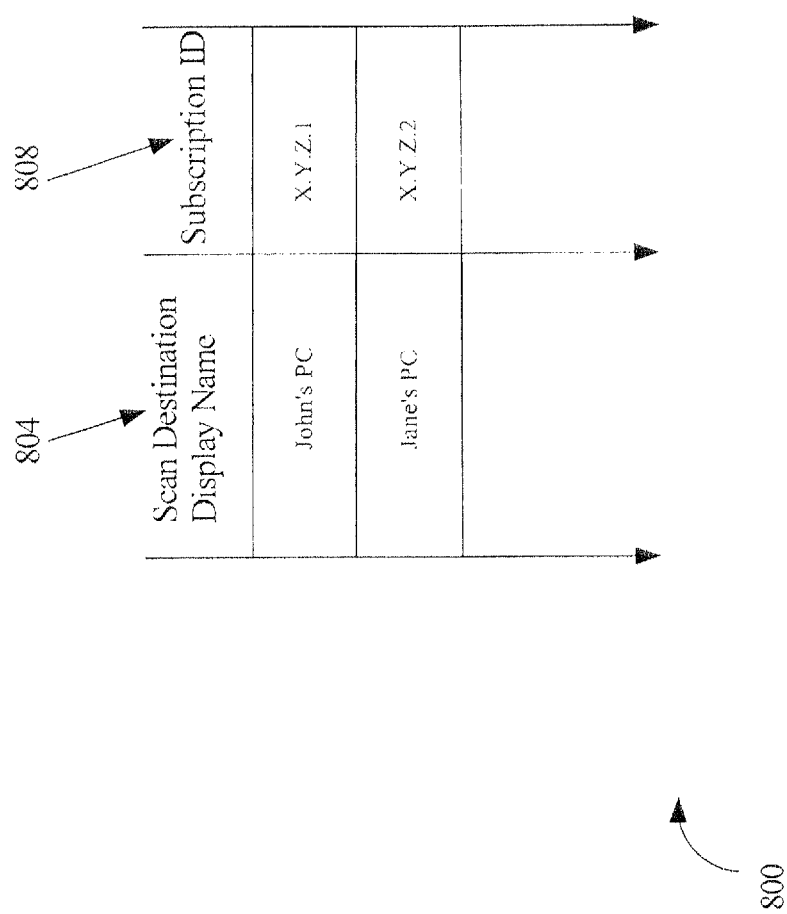
FIG. 8 is an example filtering data table according to the embodiment depicted in FIG. 7.

As shown in FIG. 8, all scan destinations are stored in a table 800, which holds not only the destination display name 804 (e.g. John's PC, Jane's PC), but also a Subscription ID field 808. As stated, a subscribe request message contains at least scan destination registration information, such as client context and also the Destination Display Name 804.

Figure 9:
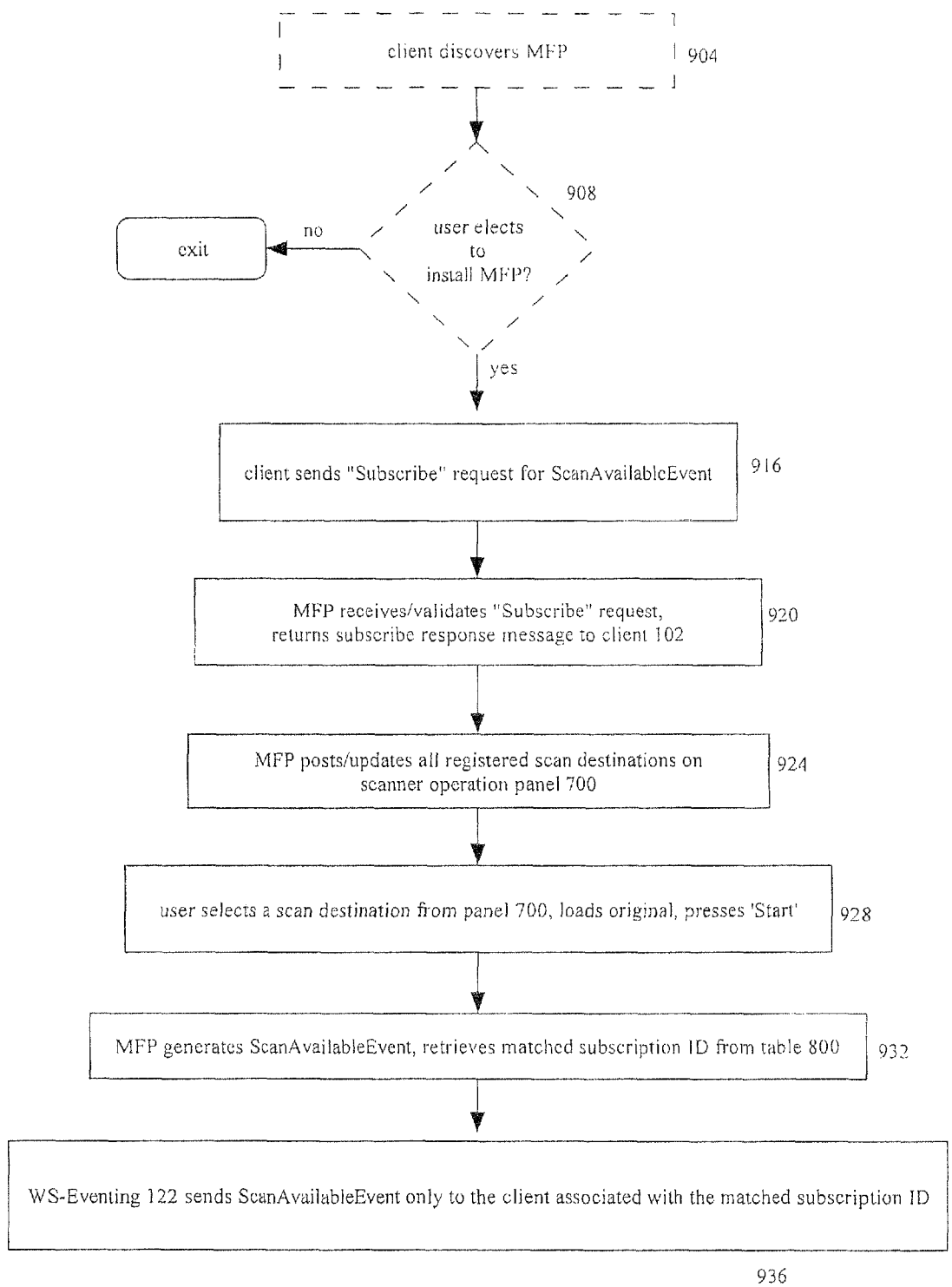
FIG. 9 is a flow diagram according to the embodiment depicted in FIGS. 7-8.
Figure 10:
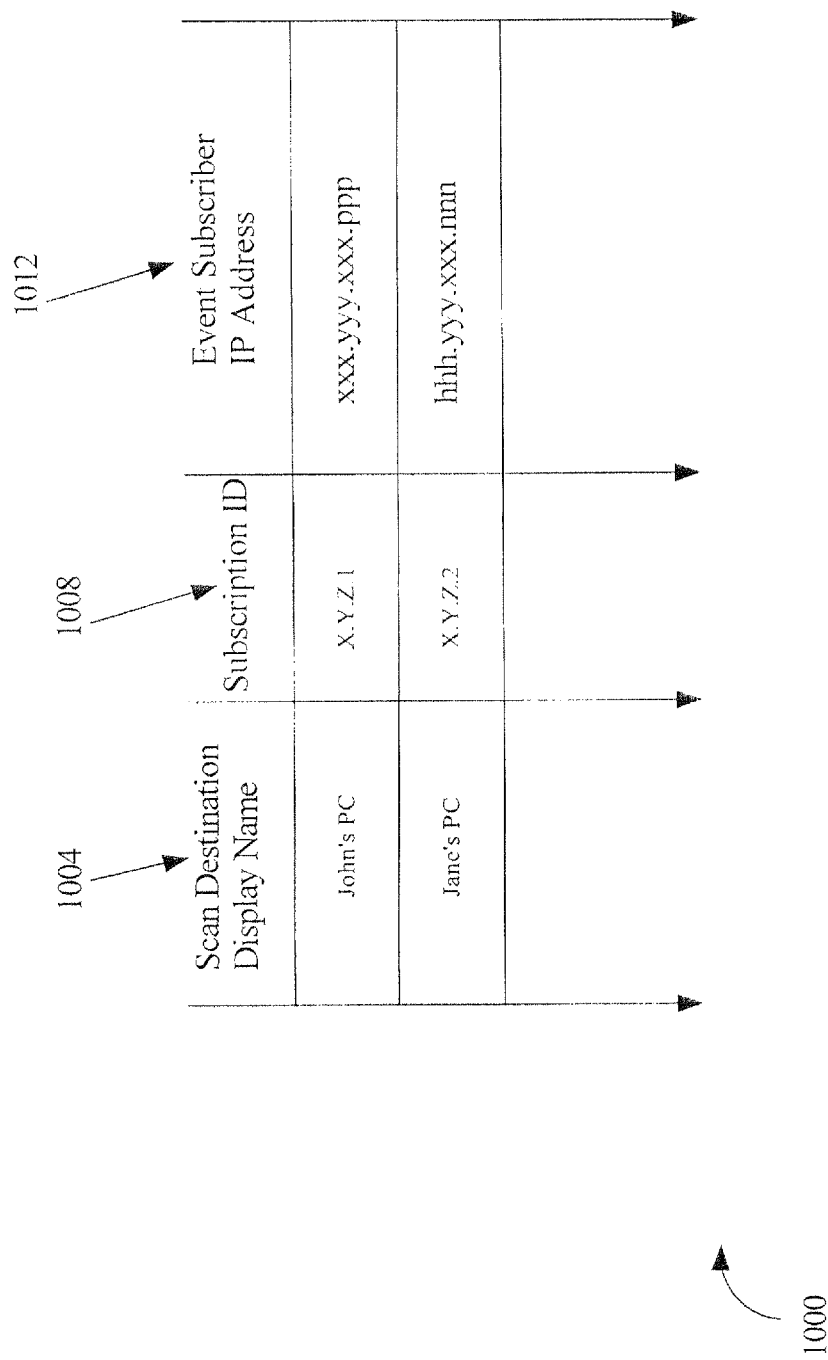
FIG. 10 is a data table according to the embodiment depicted in FIGS. 7-9.

The specific order of events of the mechanism of FIGS. 7-8 is depicted in the flowchart of FIG. 9, although certain portions such as the discovery step 904 and installation step 908 are optional, as shown by the dashed lines. Some clients 102 may use the steps 904 and 908, while other clients 102 may send a subscribe request directly, without any discovery or installation process.

Thus, where appropriate, at step 904, a client discovers a Web Services enabled MFP. Next, at step 908, a determination is made as to whether a user operating that client wants to install the MFP.

At step 916 the client sends a subscribe request to participate in ScanAvailableEvent. When the WSA receives and validates the Subscribe request, at step 920 the WSA will send back to client the subscribe response message. At step 924, the WSA posts all registered scan destinations within the operational panel 700.

The notification mechanism of FIGS. 7-8 now has enough information to fill in the notification table 800. As stated, this table 800 always has at least two fields, a destination display name 804, and a Subscription ID 808.

Within the embodiment of FIGS. 4-6, the job event subscribe request does not include any specific job information such as job ID that is to be created. Therefore, within the table 400, the client IP address becomes the correlation field to link job event subscription with job ID that is created in response to job creation request.

Conversely, within the embodiment of FIGS. 7-10, the ScanAvailableEvent subscribe request already includes scan destination registration information, which differs from the job event subscribe request associated with the table 400. Accordingly, the table 800 does not need the extra client IP address field to associate the subscription ID with the scan destination display name.

At step 928 a user selects a scan destination, loads the original, and presses a 'Start' button. At step 932, the WSA 108 generates a ScanAvailableEvent, which passes the destination display name to the ScanAvailableEvent notification reduction module. The ScanAvailableEvent notification reduction module searches the table 800 for the matched subscription ID based on the selected destination display name. If a matched entry is found, the WSA 108 composes a ScanAvailableEvent message, and passes the event body and retrieved subscription ID to the WS-Eventing module, which in turn sends a notification to the event sink defined in that subscription request. At step 936, the WS-Eventing module 122 sends that ScanAvailableEvent only to that client which is matched with the retrieved Subscription ID.

One potential additional feature of the embodiment shown in FIGS. 7-10 is the existence of a central-scanner-installer module. Some clients 102 may wish to register scan destinations having the same display name, so adding a client IP address to the table 800 would allow additional filtering criteria. Accordingly, an Event Subscriber IP Address 1004 can be added to the table 800, which gives rise to the table 1000 of FIG. 10.

The embodiment of FIGS. 7-10 as well as that of FIGS. 1-6 both have tables that use a subscription ID. The table 400 uses the client IP address to decide how to fill in the job ID field which is used as the correlation field. Meanwhile, the table 800 uses the destination display name 804 as the correlation field.

The methods depicted in FIGS. 1-10 can be extended to any WSAs that support an eventing capability, and not just the system 100 depicted herein. The described methods are suitable for any architecture that generates job-related events and is capable of associating event subscriptions with an indexing parameter based on which filtering/reduction of outgoing notifications may be performed.

Additionally, the on-off setting of the reduced notification feature may be controlled from a web UI or console UI connected to the MFP via cable or network, or any other type of administrative configuration interface.

Figure 11:
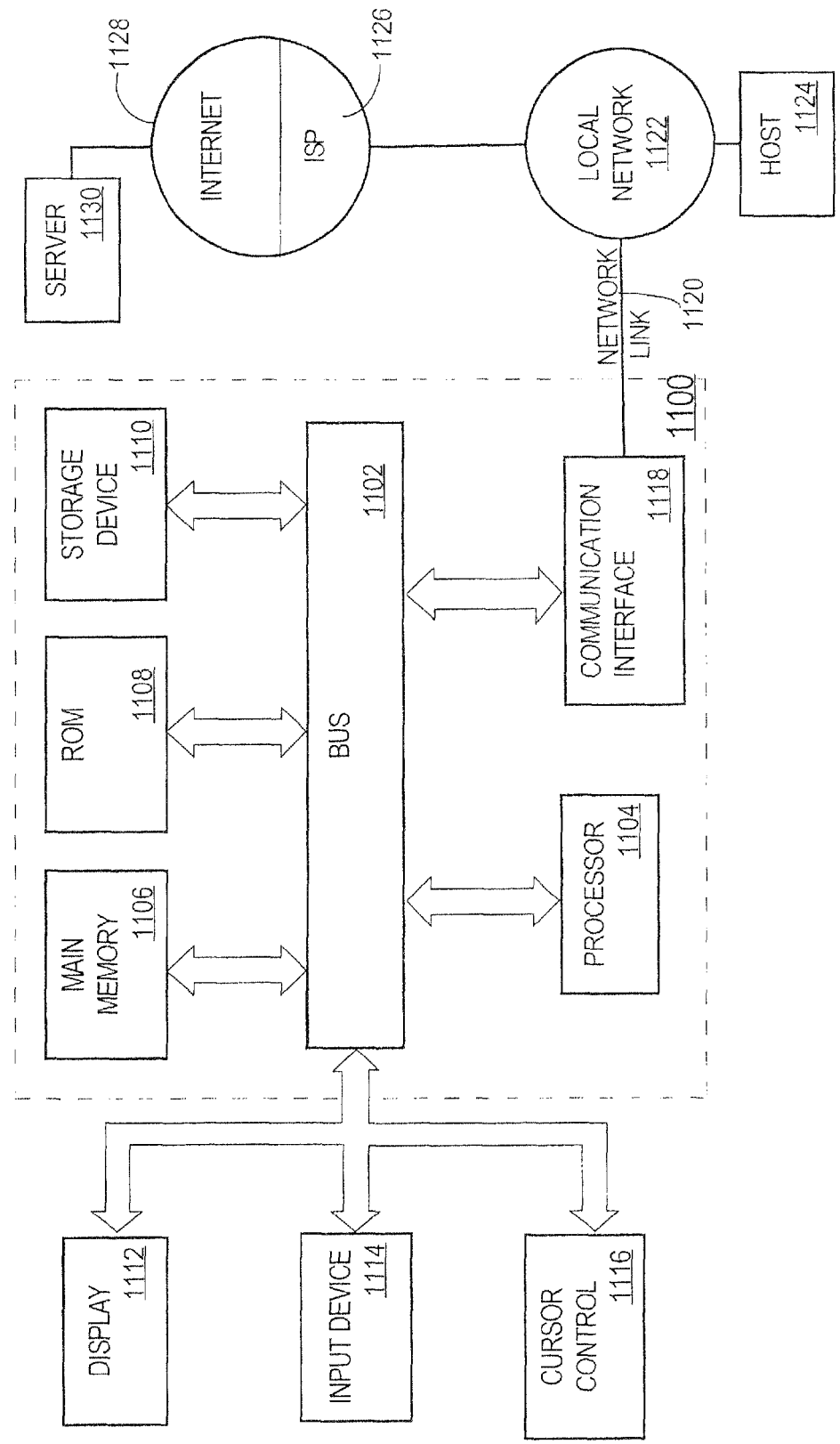
FIG. 11 is a block diagram that illustrates a computer system upon which an embodiment of the invention may be implemented.

The approaches described herein may be implemented on any type of computing platform or architecture. FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operation in a specific fashion. In an embodiment implemented using computer system 1100, various computer-readable media are involved, for example, in providing instructions to processor 1104 for execution. Such a medium may take many forms, including but not limited to, non-volatile media, and volatile media. Non-volatile media includes, for example, optical or magnetic disks, such as storage device 1110. Volatile media includes dynamic memory, such as main memory 1106.

Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution. In this manner, computer system 1100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media carrying instructions which, when executed by one or more processors, causes:
   receiving, from one or more first client devices, at a network device, a plurality of subscription requests, wherein each subscription request is associated with a subscription for one or more events;
   in response to receiving the plurality of subscription requests, storing subscription association data that associates, for each subscription request of the plurality of subscription requests, a client identifier and a subscription identifier, wherein the subscription association data is not associated with a job request;
   after storing the subscription association data, receiving, from one or more second client devices, at the network device, a plurality of job requests;
   after receiving a particular job request of the plurality of job requests, updating the subscription association data by associating a job identifier with a particular client identifier and a particular subscription identifier;
   detecting, at the network device, a plurality of events;
   determining that a particular event of the plurality of events is associated with a particular job; and
   for the particular event, causing an event notification to be sent only to a particular client device that (a) is associated with a particular subscription of the particular event, wherein the particular subscription is associated with a subscription request of the plurality of subscription requests, and (b) sent a job request, of the plurality of job requests, that is associated with the particular job;
   wherein a client device of the one or more first client devices that subscribed for the particular event does not receive a notification of the particular event.

2. The one or more non-transitory computer-readable media of claim 1, wherein the particular client device subscribed for the particular event.

3. The one or more non-transitory computer-readable media of claim 1, wherein:
   a second client device that is different than the particular client device subscribed for the particular event; and
   the particular client device is identified, at the network device, as a client device that is to be notified of the occurrence of the particular event.

4. The one or more non-transitory computer-readable media of Claim 1, wherein:
   the subscription association data is stored prior to receiving the plurality of job requests;
   the instructions, when executed by the one or more instructions, further cause, in response to receiving a second job request, of the plurality of job requests:
      determining a particular client identifier associated with the second job request;
      determining whether the second client identifier is indicated in the subscription association data;
      if the second client identifier is indicated in the subscription association data, then storing a certain job identifier, associated with the second job request, in the subscription association data in association with the second client identifier.

5. The one or more non-transitory computer-readable media of claim 1, wherein:
   causing an event notification to be sent comprises sending, from a first module executing on the network device, to a second module executing on the network device, a first subscription identifier associated with the particular subscription; and
   the second module sends the event notification to the particular client device.

6. The one or more non-transitory computer-readable media of claim 5, wherein the first module performs the steps of determining and sending the subscription identifier.

7. One or more non-transitory computer-readable media carrying instructions which, when executed by one or more processors, cause:
   storing subscription association data that associates, for each subscription request of a plurality of subscription requests, a client identifier and a subscription identifier that is unique relative to each other subscription identifier that is associated with another subscription request of the plurality of subscription requests, wherein none of the subscription identifiers is associated with a job request;
   after storing the subscription association data, receiving, from one or more client devices, at a network device, a plurality of job requests;
   for each job request of one or more of the plurality of job requests:
      determining a particular client identifier associated with said each job request,
      identifying the particular client identifier in the subscription association data, generating, at the network device, a job identifier for said each job request, wherein the job identifier is unique relative to each other job identifier that is generated for another job request of the plurality of job requests, and updating the subscription association data to associate the job identifier with a particular subscription identifier that is associated with the particular client identifier;

in response to detecting, at the network device, a first event that is associated with a first job request:
    determining a first job identifier associated with the first job request, and
    determining whether the first job identifier is indicated in the subscription association data, and
    in response to determining that the first job identifier is indicated in the subscription association data, causing a particular notification to be sent to a particular client device that is associated with the client identifier that is associated with the first job identifier indicated in the subscription association data; and in response to detecting, at the network device, a second event that is associated with a second job request that is different than the first job request:
    determining a second job identifier associated with the second job request,
    determining whether the second job identifier is indicated in the subscription association data, and
    in response to determining that the second job identifier is not indicated in the subscription association data, determining to not cause a notification about the second event to be sent.

8. The one or more transitory computer-readable media of claim 7, wherein:
    the subscription association data is stored in a table that comprises a plurality of columns;
    the plurality of columns include a first column that stores subscription identifiers, a second column that stores client identifiers, and a third column that stores job identifiers after one or more of the plurality of job requests are received.

9. The one or more transitory computer-readable media of claim 8, wherein:
    the plurality of columns include a fourth column that corresponds to an event sink includes second client identifiers;
    at least one row of the table includes a first client identifier in the second column and a second client identifier in the fourth column; and
    the second client identifier is different than the first client identifier.

10. The one or more non-transitory computer-readable media of claim 7, wherein:
    the second event is of a particular type; and
    the notification about the second event is not sent to a certain client device even though, at the time the second event was received, the certain client device subscribed for events of the particular type.

11. The one or more non-transitory computer-readable media of claim 7, wherein:
    causing the particular notification to be sent to the particular client device comprises sending, from a first module, to a second module, a subscription identifier associated with first job identifier indicated in the subscription association data; and
    the second module sends the particular notification to the particular client device.

12. The one or more non-transitory computer-readable media of claim 11, wherein the first module performs the steps of associating, determining whether the first job identifier is indicated in the subscription association data, and sending the subscription identifier to the second module.

13. One or more non-transitory computer-readable media carrying instructions which, when executed by one or more processors, cause:
    receiving, from a plurality of client devices, at a scan device, a plurality of event subscription requests, wherein each event subscription request is for receiving a notification of one or more events that are generated by the scan device;
    in response to receiving the plurality of event subscription requests, storing, at the scan device, a plurality of associations for the plurality of event subscription requests, wherein each association of the plurality of associations associates a scan destination identifier with a subscription identifier;
    after storing the plurality of associations, receiving, at the scan device, a scan event that is associated with a particular scan destination identifier;
    in response to receiving the scan event, determining whether the particular scan destination identifier is indicated in the plurality of associations;
    only if the particular scan destination identifier is indicated in the plurality of associations, then:
        identifying, in an association, of the plurality of associations, that includes the particular scan destination identifier, a particular subscription identifier that is associated with the particular scan destination identifier, and
        causing a notification of the scan event to be sent to a client device that is associated with the particular subscription identifier;
    wherein one or more client devices that have subscribed for the scan event do not receive a notification of the scan event.

14. The one or more non-transitory computer-readable media of claim 13, wherein:
    each association in the plurality of associations corresponds to a different subscription of the plurality of event subscription requests; and
    the plurality of associations are stored in response to receiving the plurality of-event subscription requests.

15. The one or more non-transitory computer-readable media of claim 13, wherein the scan event is generated in response to a user that selects a scan destination that corresponds to the particular scan destination identifier, loads a printed document onto a scanning interface of the scan device, and provides input that causes the scan device to scan the printed document.

16. The one or more non-transitory computer-readable media of claim 13, wherein the scan destination identifier is a scan destination display name.

* * * * *